(12) United States Patent
Eberle

(10) Patent No.: US 9,822,843 B2
(45) Date of Patent: Nov. 21, 2017

(54) PLANETARY GEAR BOX FOR POWER STRUTS

(71) Applicant: Hi-Lex Controls, Inc., Rochester Hills, MI (US)

(72) Inventor: Fred Eberle, Rochester Hills, MI (US)

(73) Assignee: Hi-Lex Controls, Inc., Rochester Hills, MI (US)

( * ) Notice: Subject to any disclaimer, the term of this patent is extended or adjusted under 35 U.S.C. 154(b) by 64 days.

(21) Appl. No.: 14/960,636

(22) Filed: Dec. 7, 2015

(65) Prior Publication Data

US 2017/0159753 A1 Jun. 8, 2017

(51) Int. Cl.
*F16H 57/08* (2006.01)
*F16H 1/46* (2006.01)
*F16H 57/029* (2012.01)
*F16H 25/20* (2006.01)

(52) U.S. Cl.
CPC .............. *F16H 1/46* (2013.01); *F16H 25/20* (2013.01); *F16H 57/029* (2013.01); *F16H 57/082* (2013.01); *F16H 2025/2087* (2013.01)

(58) Field of Classification Search
None
See application file for complete search history.

(56) References Cited

U.S. PATENT DOCUMENTS

| | | | | |
|---|---|---|---|---|
| 3,081,648 A | * | 3/1963 | Duer | F16H 1/28 475/342 |
| 3,675,510 A | * | 7/1972 | Duggar, Jr. | F16H 1/46 165/900 |
| 5,366,423 A | * | 11/1994 | Mori | F16H 1/28 475/338 |
| 6,379,276 B1 | | 4/2002 | Cheng | |
| 6,632,154 B2 | * | 10/2003 | Ushikoshi | F16H 1/46 475/338 |
| 2013/0040777 A1 | | 2/2013 | Gassmann et al. | |
| 2013/0252781 A1 | | 9/2013 | Hagedorn | |
| 2013/0269305 A1 | | 10/2013 | Wang et al. | |
| 2014/0106926 A1 | | 4/2014 | Hagedorn | |
| 2014/0135166 A1 | | 5/2014 | Wang | |

FOREIGN PATENT DOCUMENTS

EP 2369125 9/2011

* cited by examiner

*Primary Examiner* — Dirk Wright

(74) *Attorney, Agent, or Firm* — Brinks Gilson & Lione

(57) ABSTRACT

A planetary gear box assembly includes a plastic gear box housing and a first and a second monolithic housing part. The first-stage and second-stage housing parts each have an end face on one axial end of the housing part, and a surrounding wall. A first-stage ring gear is formed inside the surrounding wall of the first-stage housing part, and a second-stage ring gear is formed inside the surrounding wall of the second-stage housing part. The planetary gear box assembly has a planetary gear carrier with a generally cylindrical carrier body with a cylinder wall and a window extending through the cylinder wall. The window is axially adjoined by a first and a first radial pocket. The first and first radial pockets are radial indentations in a radially outer surface of the cylinder wall and accommodate planetary shaft ends of planetary gears.

20 Claims, 3 Drawing Sheets

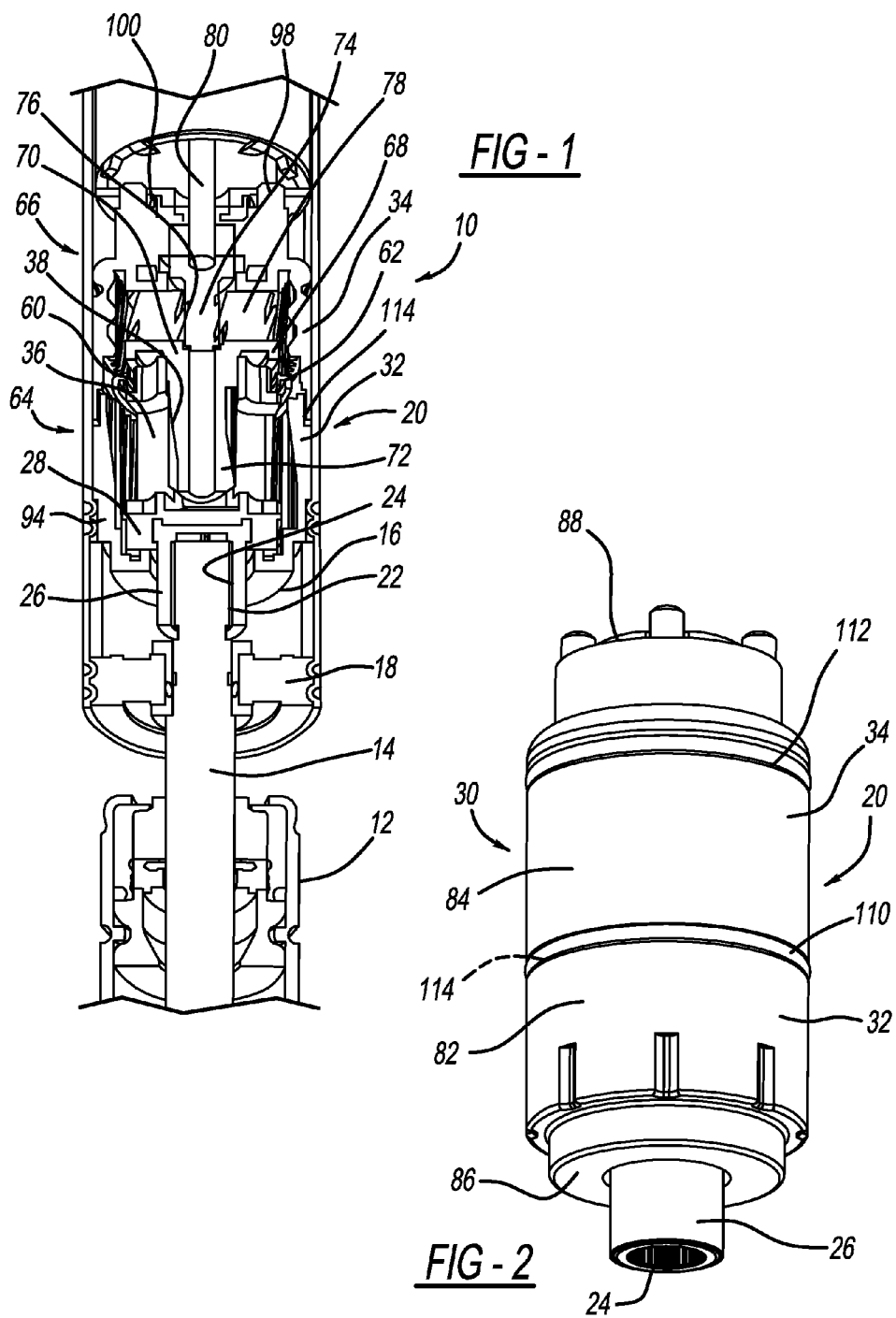

PLANETARY GEAR BOX FOR POWER STRUTS

TECHNICAL FIELD

The present invention relates to a planetary gear box assembly including a planetary gear carrier holding at least one planetary gear with a planetary gear wheel and two planetary shaft ends.

BACKGROUND

Planetary gear assemblies have traditionally been used for angular-velocity reduction from an input shaft to an output shaft. Traditional planetary gear assemblies are composed of a sun gear, a ring gear, and planetary gears. The planetary gears are located between the ring and sun gears and are connected to a planetary gear carrier which equally spaces the planetary gears about the sun gear. Two or more planetary gear carriers may be lined up to form several stages of the planetary gear assembly.

Planetary gear assemblies of the above-mentioned type are used in numerous industrial and commercial device applications. One application is in electromechanically driven power struts between a drive motor and a drive spindle. Power struts of this type find their application in tailgates and liftgates, or in other hinged structures for opening and closing a panel or other component.

SUMMARY OF THE INVENTION

The present application discloses a planetary gear box assembly that, according to a first aspect of the invention, includes a plastic gear box housing having a monolithic first-stage housing part and a monolithic second-stage housing part. The first-stage housing part has a first end face on one axial end of the first-stage housing part, a first surrounding wall, and a first-stage ring gear formed inside the first surrounding wall. The second-stage housing part has a second end face on one axial end of the second-stage housing part, a second surrounding wall, and a second-stage ring gear formed inside the second surrounding wall. Because the first-stage and second-stage ring gears are formed on two different plastic parts, the materials for the first-stage and second-stage ring gears can be individually chosen for structural and other characteristics without causing manufacturing challenges, while at the same time only requiring two housing parts for forming a complete gear box housing.

The first-stage and second-stage housing parts may enclose the complete planetary gear assemblies except for a first central opening in the first end face adapted to an outside diameter of a drive hub and a second central opening in the second end face adapted to an outside diameter of an output shaft. This arrangement ensures a compact and secure preassembly of the planetary gear box assembly prior to installation.

Further, for easy assembly, the first-stage and second-stage housing parts may bear complementary snap features on open ends of the surrounding walls, adapted for connecting the first-stage and second-stage housing parts with each other at the open ends of the surrounding walls, thereby forming the gear box housing.

An elastic O-ring may surround the gear box housing in an axial position where the first-stage and second-stage housing parts are connected. The O-ring seals the connecting line and thus prevents contamination. It further takes up any axial slack in the connection between the first-stage and second-stage housing parts, whether made by the snap features or any other type of connection features.

Further, if at least two elastic O-rings are placed around the gear box housing axially spaced apart, these O-rings stabilize the gear box housing against tilting after installation and compensate for manufacturing tolerances. The O-rings also provide extended vibration and noise dampening leading to quieter operation of the power strut.

Preferably, at least one of the first-stage housing part and the second-stage housing part has an anti-rotation feature that, when placed in a surrounding structure of complementary shape, forms a mating connection positively locking the at least one of the first-stage and second-stage housing parts against rotation relative to the surrounding structure. Such anti-rotation feature may include a profile on one of the first and second end faces or on a surface of one of the first and second surrounding walls, or both.

According to a further aspect of the invention, the planetary gear box assembly may include a planetary gear carrier having a generally cylindrical carrier body with a cylinder wall and a central axial cavity defining a central axis, with a window extending through the cylinder wall, the window being axially adjoined by a first radial pocket on a first axial side of each the window and a second radial pocket on a second axial side of the window opposite the second radial pocket, the first and second radial pockets being radial indentations in a radially outer surface of the cylinder wall. The carrier body may consist of molded plastic.

The planetary gear carrier may carry a planetary gear with a planetary gear wheel and two planetary shaft ends. The shaft ends may be disposed in the first radial pocket and the second radial pocket, respectively, and the planetary gear wheel disposed in the window. Thus, the structure of the planetary gear carrier allows for an easy preassembly of the planetary gear carrier and the planetary gear by radial insertion of the shaft ends into the radial pockets to form a planetary gear assembly. A snap ring placed around the carrier body across the first radial pocket may radially secure the respective shaft end in the first radial pocket.

The planetary gear of the planetary gear assembly preferably meshes with the second-stage ring gear formed inside the second surrounding wall, and the teeth of the planetary gears may be completely accommodated within the second-stage housing part.

The planetary gear box assembly may further include a first-stage planetary gear assembly with first-stage planetary gears having teeth meshing with the first ring gear in the first surrounding wall. The teeth of the first-stage planetary gears are preferably completely accommodated in the first-stage housing part.

According to yet another aspect of the present invention, a power strut is configured to be extended and contracted by a rotating output shaft of an electric motor and includes a drive housing surrounding a planetary gear box assembly as described above. At least one of the first-stage housing part and the second-stage housing part may have an anti-rotation feature complementary to an anti-rotation feature formed on or fixedly connected to the drive housing. The anti-rotation feature on the at least one of the first-stage housing part and the second-stage housing part forms a mating connection with the complementary anti-rotation feature formed on or fixedly connected to the drive housing that positively locks the at least one of the first-stage and second-stage housing parts against rotation relative to the strut housing.

In a power strut of this type, a spindle shaft may be splined with a drive hub of the planetary gear box assembly, and a motor shaft may be non-rotatably connected to an input shaft of the planetary gear box assembly.

Further details and benefits of various aspects of the present invention will become evident from the following detailed description of the accompanying drawings. The drawings are provided herewith solely for illustrative purposes and are not intended to limit the scope of the present invention.

BRIEF DESCRIPTION OF THE DRAWINGS

In the drawings,

FIG. 1 shows a partial cross-sectional view of a power strut including a planetary gear box assembly;

FIG. 2 shows a side view the planetary gear box assembly of FIG. 1;

DETAILED DESCRIPTION OF THE DRAWINGS

Figure 4:
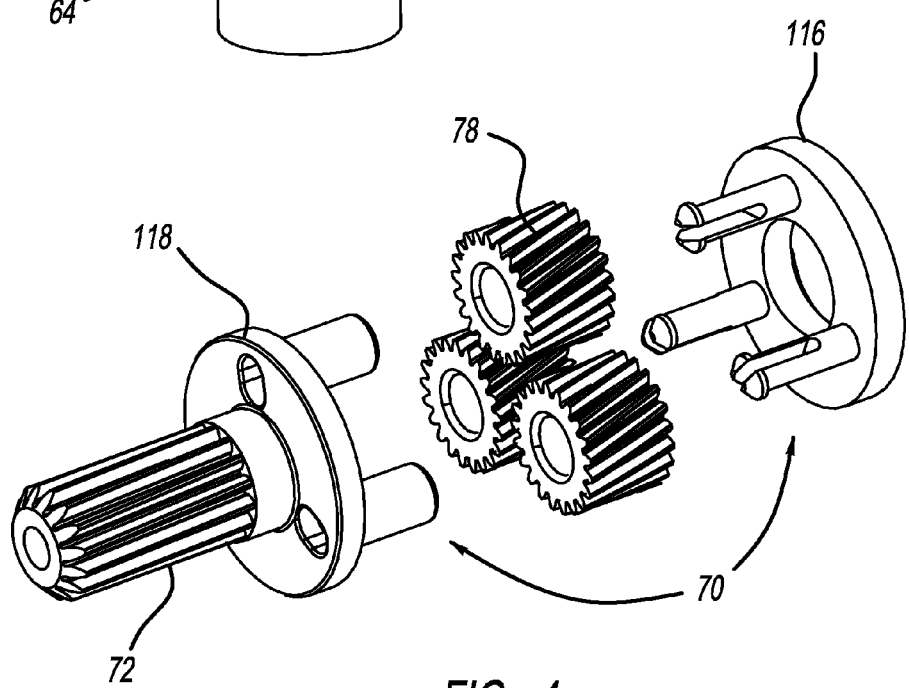
FIG. 4 shows an exploded view of a first-stage planetary gear assembly being part of the planetary gear box assembly of FIG. 2.

The drawings, except for FIG. 4, are all arranged to show the individual parts all in the same vertical orientation. The orientation has been chosen to facilitate comparison among the various drawings and does not reflect any actual installation position. Thus, any references made to top, bottom, left, right, or the like is made with respect to the orientation shown in the drawings and may differ in the installed position.

Figure 3:
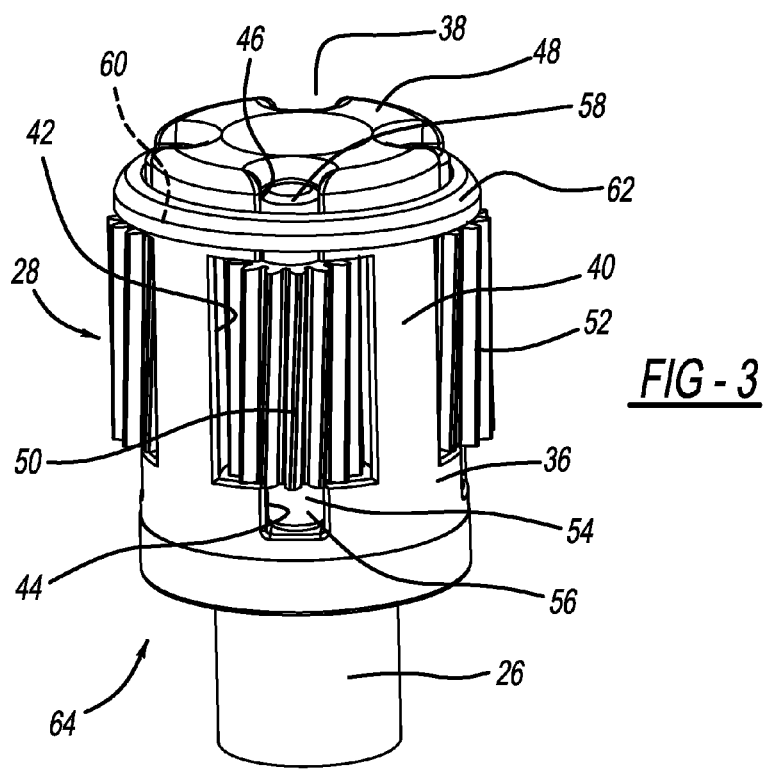
FIG. 3 shows a second-stage planetary gear assembly being part of the planetary gear box assembly of FIG. 2.

FIG. 1 of the drawings shows a partial cross-sectional view of a power strut 10 that may be installed in a motor vehicle for the automatic actuation of a hinged structure, such as a liftgate. A strut housing 12 is shown at the bottom of FIG. 1. A spindle shaft 14 extends out of the strut housing 12. The spindle shaft 14 is driven by an electric motor that is not shown. From the strut housing 12, the spindle shaft 14 extends into a cylindrical drive unit housing 16 accommodating the motor and a planetary gear box assembly 20 of the power strut 10. In some embodiments, the cylindrical drive unit housing 16 may extend further downward for receiving the strut housing 12. Outside the strut housing 12, the spindle shaft 14 is supported by a bearing 18 arranged between the strut housing 12 and the planetary gear box assembly 20. The end of the spindle shaft 14 bears an external input spline 22 that meshes with an internal spline 24 of a drive hub 26. The drive hub 26 is a fixedly attached part of a planetary gear carrier 28 as shown in FIG. 3 and extends to a second axial side thereof. The drive hub 26 forms the output shaft of the planetary gear carrier 28. The planetary gear carrier 28 is surrounded by a gear box housing 30 as shown in FIG. 2. The drive hub 26 of FIG. 1 axially extends partially out of the gear box housing 30. The spindle shaft 14 may extend partially into the gear box housing 30 as shown in FIG. 1.

The planetary gear carrier 28 has a generally cylindrical carrier body 36 that is non-rotatably molded onto the drive hub 26 to form the unitary gear carrier 28. The carrier body 36 is a molded plastic part and has a central axial cavity 38 defining a central axis surrounded by a cylinder wall 40. The central axial cavity 38 is open to a first axial side of the planetary gear carrier 28, opposite the drive hub 26. For every planetary gear 50 carried by the planetary gear carrier 28, the carrier body 36 has one window 42 extending through the cylinder wall 40. Axially adjacent to each window 42 are a second radial pocket 44 and a first radial pocket 46. The second radial pocket 44 is disposed on the second axial side, proximate to the drive hub 26, and the first radial pocket 46 is on the first axial side, proximate to the opening of the cylindrical axial cavity 38. The first and second pockets 44 and 46 of each window 42 are axially aligned with each other. Both the first and first radial pockets 44 and 46 are radial indentations in a radially outer surface of the cylinder wall 40, penetrating a partial thickness of the cylinder wall 40. The first radial pockets 46 extend through the end face 48 of the carrier body 36 of the planetary gear carrier 28 on the first axial side, while the second radial pockets 44 are axially closed toward the second axial side.

Each of the radial windows 42 carries a planetary gear 50 as best seen in FIG. 3. Each planetary gear 50 is composed of a toothed gear wheel 52 with slightly sloped teeth and a central gear shaft 54 with two shaft ends 56 and 58 that extend from both axial ends of the gear wheel 52. The toothed gear wheel 52 is rotatably borne on the gear shaft 54. The gear shaft 54 and the radial pockets 44 and 46 are dimensioned with respect to each other in a manner that the gear shaft 54 is manually insertable into the pockets 44 and 46 of the carrier body 36 and is held therein without any play. The plastic of the carrier body 36 may provide some elastic force forming a friction lock with the shaft ends 56 and 58.

Near its first axial end, the carrier body 36 includes a radially inward step 60 that carries a snap ring 62 placed around the gear carrier across the first radial pocket. The snap ring 62 radially secures the shaft ends 58 placed in the first radial pockets 46 and prevents the planet gears 50 from falling out of the carrier while being assembled into the second-stage housing part 32. This construction of the planetary gear carrier 28 allows for radial insertion of the planetary gears 50 into the carrier body 36. Previously known devices required shafts to be inserted through axial holes in the carrier body, while the planetary gear wheels were held in position aligned with the axial holes for insertion of the shafts. In contrast, the planetary carrier 28 of the present disclosure allows for preassembly of the planetary gears 50 and quick radial insertion into the carrier body 36, where they are held by elastic force. Afterwards, the snap ring 62 is pushed over the first axial end, and the assembly of the planetary gear carrier 28 with the planetary gears 50 is completed.

The planetary gear carrier 28 of FIG. 3, along with the planetary gears 50 and the snap ring 62, forms a second-stage planetary gear assembly 64 of the planetary gear box assembly 20 shown in FIGS. 1 and 2.

A first-stage planetary gear assembly 66, which is shown in an exploded view in FIG. 4, includes a planetary carrier 68 with a carrier body 70 formed of an input-side carrier part 116 and an output-side carrier part 118 that are snapped together to rotatably support first-stage planetary gear wheels 78. The teeth of the first-stage planetary gear wheels 78 are sloped at a larger angle relative to the axis of rotation than the teeth of the second-stage planetary gear wheels 52.

A geared output shaft 72 is non-rotatably connected with the output-side carrier part 118 of the first-stage carrier body 70 and extends into the central axial cavity 38 of the planetary gear carrier 28 of the second stage in the assembled state shown in FIG. 1. The outer teeth of the output shaft 72, which represents the sun gear of the second-stage planetary gears 50, meshes with the teeth of the second-stage planetary gears 50 inside the central axial cavity 38. A first-stage input shaft 74 extending in an axial cavity 76 of the first-stage planetary carrier body 70 is arranged axially opposite the output shaft 72 and forms the sun gear of the first stage. It bears outer teeth meshing with the planetary gears 78 of the first stage. The first-stage input shaft 74 is non-rotatably coupled with a motor output shaft 80 that thus drives the first-stage input shaft 74.

The gear box housing 30 surrounding the second-stage and first-stage planetary carrier assemblies 64 and 66 includes two housing parts 32 and 34, each of which is generally pot-shaped in that it includes a generally cylindrical outer wall 82 or 84 and an end face 86 or 88 forming the bottom of the pot. The end faces 86 and 88 of the gear box housing 30 are closed except for a central circular opening 90 or 92 in each of the end faces 86 and 88.

The second-stage housing part 32 is located on the spindle side of the planetary gear box assembly 20 and thus has the central opening 90 adapted to the diameter of the drive hub 26. In a variation, the drive hub 26 may be accommodated entirely inside the gear box housing 30 so that the axial central opening 90 may have a smaller diameter than the drive hub 26 and rather be adapted to the diameter of the spindle shaft 14. Either way, it is preferred that the axial central opening 90 has a diameter smaller than the diameter of the planetary carrier body 36 and axially supports the drive hub 26 and planetary carrier body 36. This allows for dropping the pre-assembled second-stage planetary gear assembly 64 into the second-stage housing part 32, where the first stage planetary gear assembly 64 will automatically occupy the proper axial position. In the shown example, the second-stage housing part 32 includes an anti-rotation feature 94 at the outer circumference of the cylindrical outer wall. In the shown example, the anti-rotation feature 94 is implemented as a plurality of indentations into which the drive unit housing 16 may be crimped after insertion of the gear box housing 30 into the drive unit housing 16.

The second-stage housing part 32 furthermore had an internal ring gear 96 meshing with the planetary gears 50 of the first stage on the outside of the carrier body 36. The gear wheels 52 of the planetary gears 50 of the second stage are preferably located entirely inside the second-stage housing part 32 so that only the motor-side shaft ends 58 of the gear shafts 54 extend axially beyond the second-stage housing part 32.

The first-stage housing part 34 is located on the motor side of the planetary gear box assembly 20 and has a central opening 92 with a diameter adapted to accommodate the first-stage input shaft 74 and the motor output shaft 80. The motor-side end face 88 of the first-stage housing part 34 may bear a profile 98 complementary to a counter profile 100 in the cylindrical drive unit housing 16 or in a face of the drive motor for establishing a non-rotatable installation of the first-stage housing part 34 without any additional deformation of the drive unit housing 16. In the shown example, the profile 98 includes molded pins that radially couple the motor and the planetary gear box assembly 20 mutually to each other.

The cylindrical wall 84 of the first-stage housing part 34 bears an internal ring gear 102 meshing with the planetary gears 78 of the first stage on the outside of the first-stage carrier body 70. Thus, the teeth of the first-stage planetary gears 78 are entirely accommodated inside the first-stage housing part 34.

As a result, the planetary gears 50 of the second stage are inserted into the second-stage housing part 32, and the planetary gears 74 of the first stage are inserted into the first-stage housing part 34 during assembly of the planetary gear box assembly 20. Thus, because neither one of the two stages needs to pass through the ring gear of the other stage for assembling the planetary gear box assembly 20, there are no constraints on the outer dimensions of either stage with respect to the ring gear of the other stage.

In prior-art planetary gear boxes, both ring gears of the first and the second stage were located in the same housing part so that the second-stage gear assembly had to be inserted through the ring gear of the first stage. After insertion of both stages, the housing was closed with an end cap. This architecture limited the outer dimensions of the second-stage gear assembly to a smaller size than the first-stage gear assembly. Furthermore, implementing two types of teeth inside the same housing part for providing both ring gears multiplies the complexity of manufacturing the housing part, even if it is molded from plastic.

In other prior-art assemblies, the ring gears of the first stage and of the second stage were separate rings that were bolted together in a modular set-up. This arrangement doubles the number of housing parts because separate housing end caps are still required. Such gear boxes have a very high rigidity that is intolerant to manufacturing variances. This arrangement thus may lead to increased wear on shafts, efficiency losses, and reduced torque capacity.

The gear box housing 30 shown in the drawings significantly simplifies the manufacture and provides for more dimensioning options by allowing a dimensionally larger and greater capacity gear reduction, that is not reduced in size, by obviating the necessity of passing elements of one stage through a prior stage ring gear.

Figure 5:
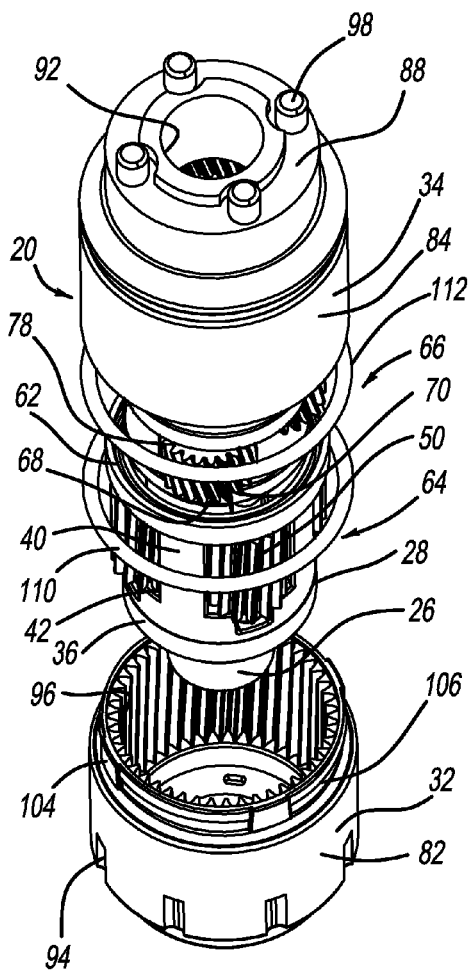
FIGS. 5 and 6 show exploded views of the planetary gear box assembly of FIG. 2 in two different perspectives.
Figure 6:
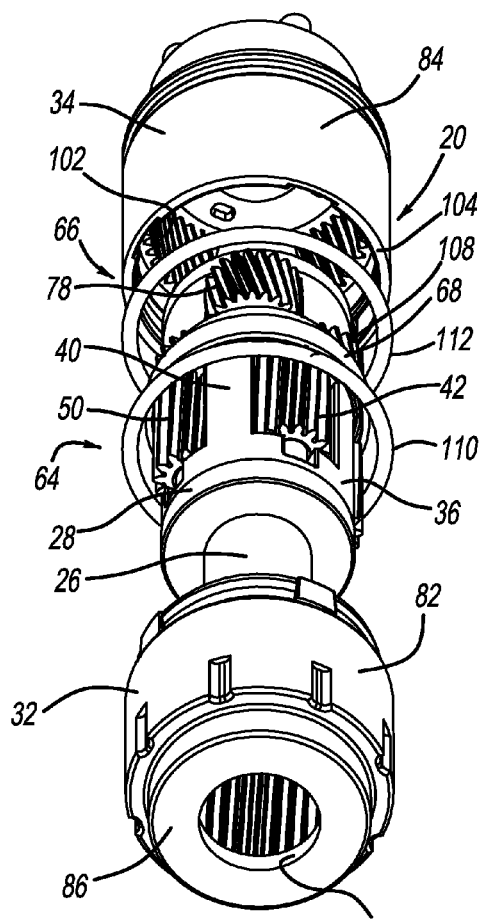

As best seen in FIGS. 4 and 5, the second-stage housing part 32 and the first-stage housing part 34 include mating snap features 104 and are assembled around the first-stage and second-stage gear assemblies 64 and 66 by rotating the first-stage and second-stage housing parts 34 and 32 into alignment of the snap features 104 and then positively snapping the first-stage and second-stage housing parts 34 and 32 together. In the shown examples, the snap features 104 formed on the second-stage housing part 32 are formed on an axial annular lip 106 of a reduced diameter relative to the outer diameter of the cylindrical wall 82. The annular lip 106 is inserted into the open end of the first-stage housing part 34, where a complementary feature 108 is formed on the inner circumference of the cylindrical wall 84 of the first-stage housing part 34.

The ring gears 96 and 102 have the ability to float slightly under load in order to balance and diffuse the load distribution due to manufacturing errors. Furthermore, with the ring gear 96 of the first stage being located in the second-stage housing part 32 and the ring gear 102 of the second stage located in the first-stage housing part 34, the first and second ring gears 96 and 102 can be molded out of different plastic materials so that the second-stage ring gear 102 may be harder to be able to sustain a greater torsional load than the first-stage ring gear 96. This is a great advantage in power gearing because the second-stage reduction generates a higher torque requirement than the first stage.

On the cylindrical outside of the gear box housing 30, a first elastic O-ring 110 and a second elastic O-ring 112 are arranged axially spaced apart. The first O-ring 110 is located at the seam 114 between the second-stage housing part 32 and the first-stage housing part 34 and fulfills two functions. On the one hand, the first O-ring 110 protects the seam from ingress or contamination by sealing the seam around the circumference of mating ring of the first-stage and the second-stage housing parts 34 and 32. On the other hand, and in cooperation with the second O-ring 112, the first O-ring 110 provides for radial positioning of the gear box housing 30 inside the drive unit housing 16. The axial space between the first and second O-rings 110 and 112 reduces tilting. In addition, the elasticity of the first and second O-rings 110 and 112 works to dampen vibration and transmission of structure-borne noise. The first and second O-rings 110 and 112 also compensate for dimensional stack-up tolerances inside the drive housing 20.

While the description has consistently referred to the first stage and the second stage of the planetary gear box assembly, the two housing parts 32 and 34 may constitute end parts of a modular gear box assembly with additional stages interposed between the first-stage housing part 34 and the housing part 32, which then, instead of housing the second stage, accommodates the last stage of three or more reduction stages. While intermediate housing parts are not shown, the interface with other housing parts on the input side corresponds to the snap feature 104 of housing part 32, for example including the annular lip 106, and the interface of the intermediate housing parts with other housing parts on the output side corresponds to the snap feature 104 of housing part 34 for a modular composition of the resulting planetary gear box assembly.

While the above description constitutes the preferred embodiments of the present invention, it will be appreciated that the invention is susceptible to modification, variation and change without departing from the proper scope and fair meaning of the accompanying claims.

What is claimed is:

1. A planetary gear box assembly comprising
a plastic gear box housing including a monolithic first-stage housing part and a monolithic second-stage housing part, the first-stage housing part having
a first end face on one axial end of the first-stage housing part,
a first surrounding wall, and
a first-stage ring gear formed inside the first surrounding wall,
the second-stage housing part having
a second end face on one axial end of the second-stage housing part,
a second surrounding wall, and
a second-stage ring gear formed inside the second surrounding wall,
wherein the first end face has a first central opening adapted to an outside diameter of a drive hub and the second end face has a second central opening adapted to an outside diameter of an output shaft.

2. The planetary gear box assembly of claim 1, wherein the first-stage and second-stage housing parts bear complementary snap features on open ends of the surrounding walls, adapted for connecting the first-stage and second-stage housing parts with each other at the open ends of the surrounding walls, thereby forming a gear box housing.

3. The planetary gear box assembly of claim 2, wherein an elastic O-ring surrounds the gear box housing in an axial position where the first-stage and second-stage housing parts are connected.

4. A planetary gear box assembly comprising
a plastic gear box housing including a monolithic first-stage housing part and a monolithic second-stage housing part, the first-stage housing part having
a first end face on one axial end of the first-stage housing part,
a first surrounding wall, and
a first-stage ring gear formed inside the first surrounding wall,
the second-stage housing part having
a second end face on one axial end of the second-stage housing part,
a second surrounding wall, and
a second-stage ring gear formed inside the second surrounding wall,
wherein at least one of the first-stage housing part and the second-stage housing part has an anti-rotation feature that, when placed in a surrounding structure of complementary shape, forms a mating connection positively locking the at least one of the first-stage and second-stage housing parts against rotation relative to the surrounding structure.

5. The planetary gear box assembly of claim 4, wherein the anti-rotation feature comprises a profile on one of the first and second end faces.

6. The planetary gear box assembly of claim 4, wherein the anti-rotation feature comprises a profile on a surface of one of the first and second surrounding walls.

7. The planetary gear box assembly of claim 1, further comprising
a planetary gear carrier having a generally cylindrical carrier body with a cylinder wall and a central axial cavity defining a central axis, with a window extending through the cylinder wall, the window being axially adjoined by a second radial pocket on a second axial side of each the window and a first radial pocket on a first axial side the window opposite the second radial pocket, the first and first radial pockets being radial indentations in a radially outer surface of the cylinder wall.

8. The planetary gear box assembly of claim 7, wherein the carrier body consists of molded plastic.

9. The planetary gear box assembly of claim 7, wherein the first radial pocket axially extends to an axial end of the planetary gear carrier.

10. The planetary gear box assembly of claim 7, further comprising a snap ring placed around the carrier body across the first radial pocket.

11. The planetary gear box assembly of claim 7, further comprising a drive hub having an internal input spline, the drive hub being molded into the planetary gear carrier on the second axial side, the input spline being axially aligned with the central axial cavity.

12. The planetary gear box assembly of claim 7, further comprising
a planetary gear with a planetary gear wheel and two planetary shaft ends, the shaft ends disposed in the second radial pocket and the first radial pocket, respectively, and the planetary gear wheel disposed in the window.

13. The planetary gear box assembly of claim 12, wherein the shaft ends are held in at least the second radial pocket or the first radial pocket by a friction lock.

14. The planetary gear box assembly of claim 9, wherein the planetary gear has teeth meshing with the first-stage ring gear formed inside the first surrounding wall.

15. The planetary gear box assembly of claim 14, wherein the teeth of the planetary gear are axially completely accommodated within the first-stage housing part.

16. The planetary gear box assembly of claim 7, wherein the planetary gear carrier is the planetary gear carrier of a first planetary stage, further comprising a second-stage planetary gear assembly 64 with second-stage planetary gears having teeth meshing with the second ring gear in the second surrounding wall.

17. The planetary gear box assembly of claim 16, wherein the teeth of the second-stage planetary gears are completely accommodated in the second-stage housing part.

18. A power strut configured to be extended and contracted by a rotating output shaft of an electric motor, the power strut including a drive housing surrounding a planetary gear box assembly having
- a plastic gear box housing comprising a monolithic first-stage housing part and a monolithic second-stage housing part, the first-stage housing part having
  - a first end face on one axial end of the first-stage housing part,
  - a first surrounding wall, and
  - a first-stage ring gear formed inside the first surrounding wall,
- the second-stage housing part having
  - a second end face on one axial end of the second-stage housing part,
  - a second surrounding wall, and
  - a second-stage ring gear formed inside the second surrounding wall, wherein at least one of the first-stage housing part and the second-stage housing part has an anti-rotation feature complementary to an anti-rotation feature formed on or fixedly connected to the strut housing, the anti-rotation feature on the at least one of the first-stage housing part and the second-stage housing part forming a mating connection with the complementary anti-rotation feature formed on or fixedly connected to the drive housing that positively locks the at least one of the first-stage and second-stage housing parts against rotation relative to the drive housing.

19. The power strut of claim 18, further comprising a drive spindle non-rotatably connected to an output shaft of the planetary gear box assembly.

20. The planetary gear box assembly of claim 2, wherein at least two elastic O-rings are placed around the gear box housing, the at least two elastic O-rings being axially spaced apart.

* * * * *